United States Patent Office 3,348,897
Patented Oct. 24, 1967

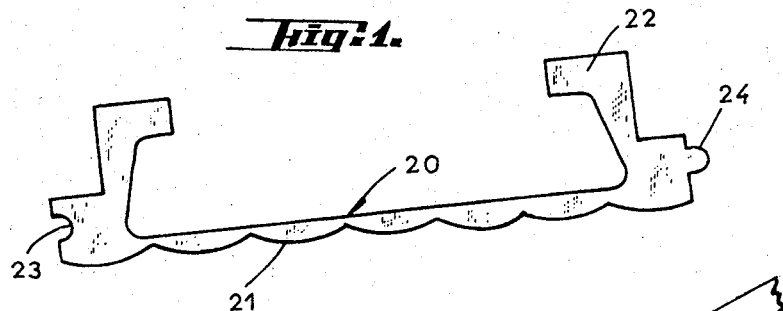
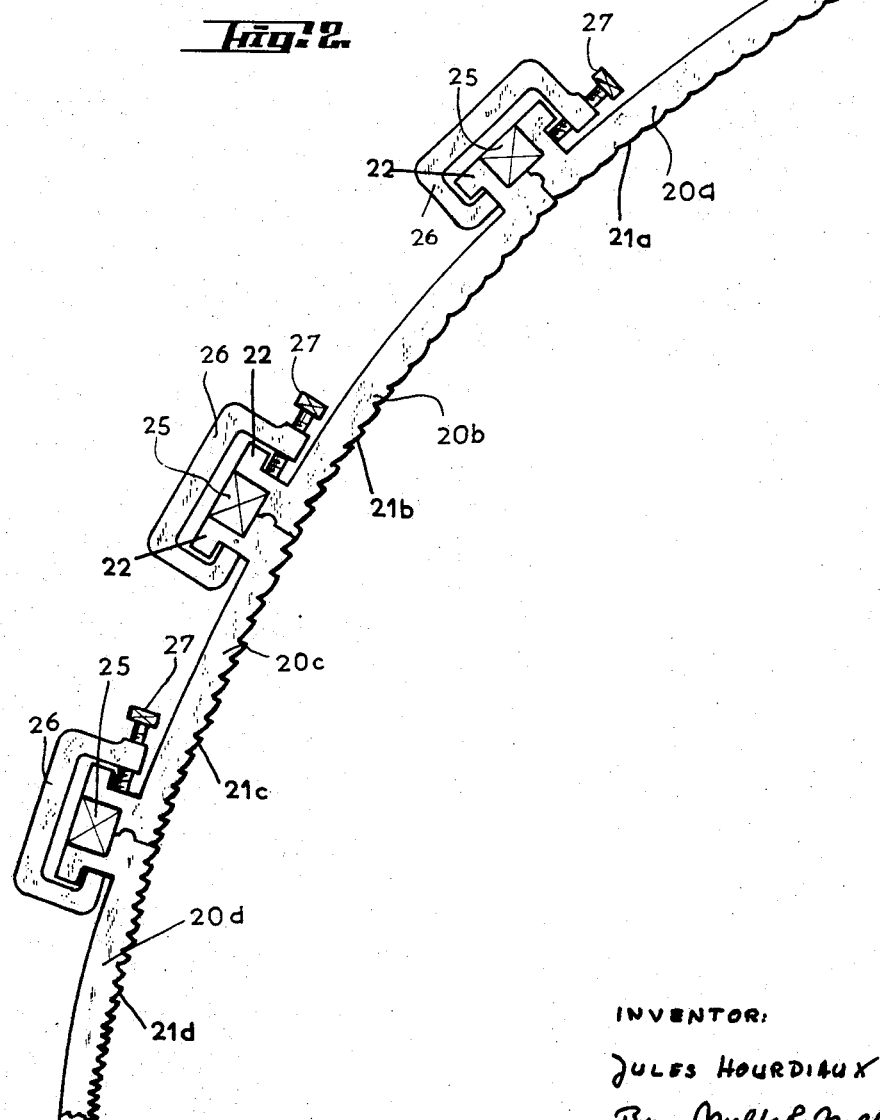

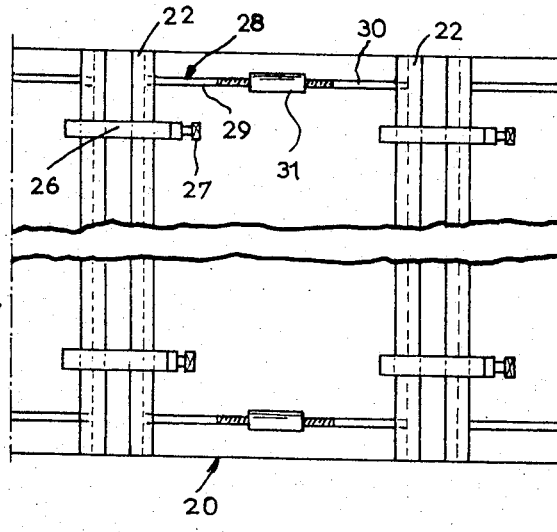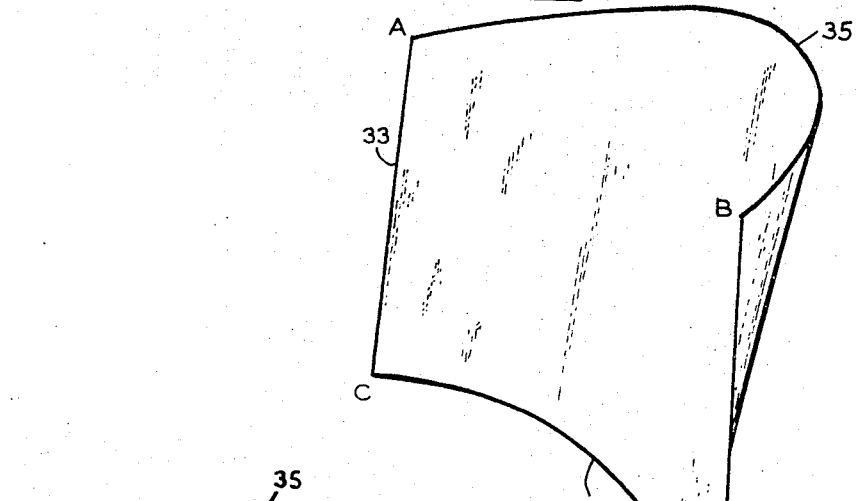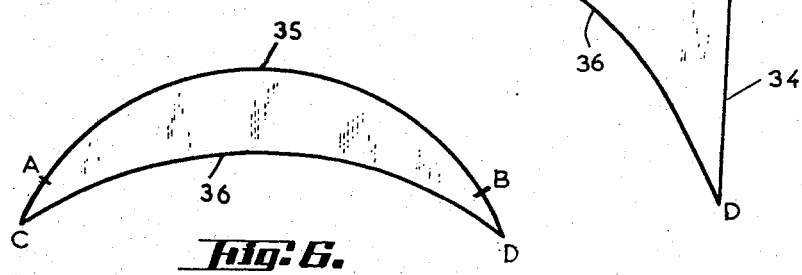

3,348,897
CURVED SCREENS FOR PROJECTING MOTION PICTURE FILMS OR THE LIKE
Jules Hourdiaux, 96 Ave. de Versailles,
Paris 16°, Seine, France
Original application Apr. 3, 1964, Ser. No. 360,163, now Patent No. 3,295,910, dated Jan. 3, 1967. Divided and this application Sept. 7, 1966, Ser. No. 577,731
Claims priority, application France, Apr. 6, 1963, 930,681, Patent 1,434,929
5 Claims. (Cl. 350—125)

ABSTRACT OF THE DISCLOSURE

Projection screen comprising a series of individual panels which are secured together in side-by-side relation. Each panel comprises a sectional member formed with a plurality of integral longitudinal ribs, each rib having a light-diffusing front face, said front faces together constituting a single curved projection surface and being substantially parallel to a direction perpendicular to the projection axis throughout the screen surface. Said panels are kept assembled and clamped against each other by means of screw clamps.

---

This is an application divided from application Ser. No. 360,163 filed on Apr. 3, 1964, now Patent No. 3,295,910.

Said application Ser. No. 360,163 discloses and claims a projection screen comprising a series of individual panels which are secured together in side-by-side relation, each panel comprising at least one upper and one lower shoe each provided with a curved shoulder, securing plates mounted on said shoes, a plurality of elongated juxtaposed screen elements comprising rigid members extending between said shoes, each rigid member having a slightly bulged portion provided with a light-diffusing front face, said front faces together constituting a single curved projection surface and being substantially parallel to a direction perpendicular to the projection axis throughout the screen surface, said rigid members being clamped between the shoulders of said shoes whereby they are maintained in proper spacial relationship and angular setting.

The present application specifically relates to a projection screen comprising a series of individual panels which are secured together in side-by-side relation, each panel comprising a sectional member formed with a plurality of integral longitudinal ribs, each rib having a light-diffusing front face, said front faces together constituting a single curved projection surface and being substantially parallel to a direction perpendicular to the projection axis throughout the screen surface.

According to another feature of the invention, said sectional members are formed each with two side lugs and assembled together along said side lugs by means of clamp members.

According to a further feature of the invention the projection screen further comprises a curvature control device for the sectional members comprising a pair of axially aligned rods the remotest ends of which engage said side lugs, said rods having opposite screw-threaded portions engaging a common adjusting nut adapted to move said rods away from or towards each other.

The panels according to the present invention must be so constructed that the complete screen may have any desired and suitable configuration, notably cylindrical or spherical, concave or convex; since, as a rule, the projection apparatus is at a higher level than the horizontal center line of the screen when the latter is cylindrical with vertical generatrices, thus producing an objectionable asymmetry in the final projector and screen assembly, it is possible, according to a complementary feature of this invention, to provide panels, and, if desired, the frame structure associated therewith, of such configuration, that this asymmetry be reduced to a minimum; this result may be obtained for example by inclining backwards a concave cylindrical screen or by utilizing a concave screen meeting the following requirements:

(a) Its surface configuration is derived from a cylindrical surface but differing therefrom in that the radii of curvature of the cross sections taken upon successive planes increase gradually.

(b) This surface is so directed with respect to the horizontal plane and so bound, that the final or complete screen comprises two substantially vertical lateral sides and two horizontal upper and lower sides, the aforesaid planes being horizontal and the radii of curvature increasing from the lower side to the upper side.

These screen shapes are advantageous notably in that they eliminate substantially for the audience distortions such as barrel distortion.

Other features and advantages of this invention will appear as the following description proceeds with reference to the accompanying drawings showing various forms of embodiment of curved screens constructed according to the invention. In the drawings:

FIGURE 1 is a cross-section showing a sectional member constituting a panel according to a typical form of embodiment of this invention;

FIGURE 2 is a plane view from above showing a typical method of assembling screen panels of the type illustrated in FIGURE 1, this construction permitting of dispensing with the provision of a frame structure;

FIGURE 3 is a rear view showing an assembly procedure somewhat similar to the preceding one in the case of panels of the type shown in FIGURE 1;

FIGURE 5 is a perspective view showing another screen arrangement according to this invention;

FIGURE 6 is a projection on a horizontal plane of the screen contour shown in FIGURE 5;

Figure 4:
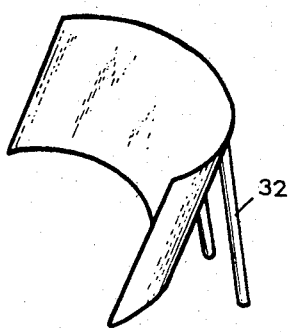
FIGURE 4 illustrates a screen arrangement according to this invention.

The sectional member illustrated in FIGURE 1 constitutes a part of a curved projection screen and is provided to be located in the central portion of the screen; this sectional member 20 has ribs 21 formed on its visible face to constitute the light-diffusing elements; it also carries side lugs 22 which are substantially parallel to ribs 21, said lugs being provided for clamping juxtaposed members 20 against each other, said lugs being formed on their lateral surface the one with a groove 23 and the other with a bead 24 adapted to engage the registering groove 23 of the adjacent sectional member.

FIGURE 2 illustrates an assembly comprising four sectional members of the aforesaid type; longitudinal gaskets or like elements 25 are interposed between the outer faces of the coupled lugs of adjacent sectional members; these sectional members are kept assembled and clamped against each other by means of screw clamps 26 actuated by screws 27 in a well known manner; the means illustrated in FIGURE 3 permit of modifying at will the curvature of the sectional member by reducing or increasing same exactly to the desired value, irrespective of the position of the panel concerned in the complete screen, in case the desired and proper shape were not obtained directly during the shaping operation, for example with a view to simplify the manufacture by making only non-curved sectional members; this adjustment of the curvature of the sectional members is obtained by means of special extension devices 28 comprising two axially aligned rods 29, 30 having opposite screw threaded inner portions engaging internal opposite threadings of a common adjusting nut or turnbuckle 31, these rods bearing with their outer or opposite ends against the internal sides of the two lugs 22 of the corresponding sectional member 20. By turning said nut 31, the rods 29 and 30 are moved away from or towards each other, resulting in an increase or a decrease respectively of the total length of the device. Since the lugs 22 are substantially perpendicular to the general plane of the sectional member, it is obvious that increasing the length will force said lugs away from each other and consequently will increase the curvature of the sectional member. Turning the nut 31 in the other direction will permit said sectional member to return to its previous curvature. Each sectional member may be provided with a plurality of extension devices, for instance, two devices as shown on FIGURE 3.

FIGURES 1 and 2 illustrate on the other hand the manner in which the angular setting or direction of the mat light-diffusing faces (constituting in this case light-diffusing elements incorporated in a unitary structure) carried by the sectional members is obtained; in the sectional member 20 of FIGURE 1 which corresponds to a panel located in the central portion of the screen all the ribs 21 have substantially the same inclination with the corresponding region of the section body, this angle being practically zero; on the other hand a sectional member such as 20d of FIGURE 2 is formed with ribs 21d of which the useful portions have an angular position which with respect to the corresponding region of the body of the sectional member, is practically the same for all the ribs, the angle formed between the useful portion of any one rib and said corresponding region being greater than in the case of sectional member 20; the corresponding angles of sectional members 20c, 20b and 20a have intermediate values; the angular setting of the useful portions of these ribs is governed by the fact that these portions must be substantially perpendicular to the axis of the film projection beam.

Of course, this perpendicularity may also be obtained in a still better way by gradually varying the preceding angle on a same panel, so that no discontinuity in the value of this angle occurs when passing from one sectional member to the next one, but it is obvious that this specific arrangement is likely to complicate more or less the panel design.

FIGURE 4 shows a cylindrical screen inclined obliquely to the horizontal and supported at the back by struts shown very diagrammatically at 32, the contour of this screen is formed by sides which are neither vertical nor horizontal; however, the cylindrical surface of this screen may be extended as far as to its intersections with horizontal and vertical planes, notably to its intersection with the lower horizontal plane in order to provide a screen configuration less confusing for the spectator.

The screen shown in FIGURES 5 and 6 of the drawings has two substantially vertical sides 33 (AC) and 34 (BD) and two sides 35 (AB) and 36 (CD) lying in horizontal planes, the upper side 35 having a smaller radius of curvature than the lower side 36; the increase in the radius of curvature in the direction of the lower portion of the screen is gradual, the thus illustrated surface being an adjusted surface. This increase in the radius of curvature may be obtained by properly adjusting the extension devices of the sectional member, the upper device having in this case a greater length than the lower device. The increase in the radius of curvature may also be obtained during the shaping of the panels.

This screen arrangement permits of having an upper edge AB of same length as the lower edge CD, whereby the width of the light diffusing elements may be constant throughout the panel height.

Figure 7:
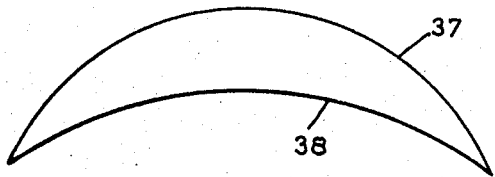
FIGURES 7 and 8 illustrate in projection on a horizontal plane the contours of two screens according to this invention.

The screen illustrated in FIGURE 7 has features similar to those of the screen shown in FIGURES 5 and 6 except that the right-hand and left-hand sides of the screen are vertical, the upper edge 37 of the screen being in this case longer than its lower edge 38. This may be obtained by utilizing substantially trapezium-shaped panels, the longer edges of said panels being their upper edges. It is to be noted that the light diffusing elements may be adapted to accommodate the shape of the panels by providing elements, the width of which increases from bottom to top in the panel.

Figure 8:
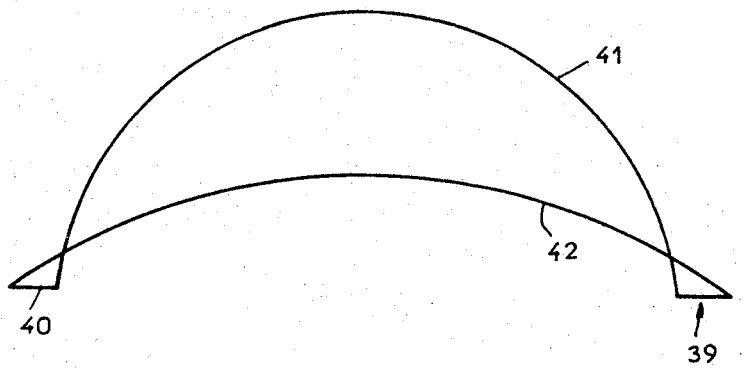

FIGURE 8 shows in projection a screen of which the right-hand and left-hand side edges 40 are inclined forwards, the upper edge 41 of this screen having in this case a smaller radius of curvature than its lower edge 42. In this case, trapezium-shaped panels are used, the lower edges of which are longer than the upper edges. Similarly, the width of the light diffusing elements decreases from bottom to top in the panel.

The sections of the screen which are taken upon successive horizontal planes may consist, in the vicinity of the right-hand and left-hand edges of this screen, of straight segments.

Of course, this invention should not be construed as being limited by the specific form of embodiment shown and described herein by way of example; thus, the panels, light-diffusing elements, frame structures, angular setting means, fastening and clamping devices, as well as the screen configurations and contours described and illustrated herein may be modified or replaced by any other suitable and equivalent arrangements and means. Changes in the precise embodiments of the invention herein disclosed may be made within the scope of what is claimed.

What I claim is:

1. A projection screen comprising a series of individual panels, each panel comprising a sectional member having longitudinal edges provided with complementary positioning means said sectional member being formed with a plurality of integral longitudinal ribs, each rib having a light-diffusing front face, said front faces together constituting a single curved projection surface and being substantially parallel to a direction perpendicular to the projection axis throughout the screen surface, said sectional member further comprising two rearward side lugs parallel to said longitudinal ribs, said panels being assembled together in side-by-side relation along said longitudinal edges, and securing means for keeping said panels assembled together, said securing means comprising clamp members embracing the respective side lugs of two adjacent panels.

2. A projection screen as claimed in claim 1, further comprising a curvature control device for the sectional members comprising a pair of axially aligned rods the remotest ends of which internally engage the two side lugs of each sectional members, said rods having opposite screw-threaded portions engaging internal opposite threadings of a common adjusting nut, whereby the rotation of said adjusting nut varies the length of said control device and consequently varies the curvature of the projection surface of said sectional member.

3. A projection screen as claimed in claim 1, wherein said single projection surface is a substantially cylindrical surface with vertical generatrices.

4. A projection screen as claimed in claim 1, wherein said single projection surface is a substantially cylindrical surface its generatrices being parallel to a plane perpendicular to the vertical plane comprising the projection axis.

5. A projection screen as claimed in claim 1, wherein said single projection surface is a surface generated by a straight line, the cross sections of said surface taken upon horizontal planes being circular arcs which on the one hand have radii of curvature increasing gradually from top to bottom and which, on the other hand, correspond to a center angle decreasing gradually from top to bottom, said circular arcs having their centers in a vertical plane comprising the projection axis.

References Cited
FOREIGN PATENTS
170,739  11/1921  Great Britain.
894,186  3/1944  France.
1,006,458  1/1952  France.
229,044  11/1958  Australia.
861,119  2/1961  Great Britain.

JULIA E. COINER, *Primary Examiner.*